(12) United States Patent
Kinder et al.

(10) Patent No.: US 9,221,446 B2
(45) Date of Patent: Dec. 29, 2015

(54) CONTROLLING AN ELECTRICALLY ACTUABLE PARKING BRAKE IN THE EVENT OF FAILURE OF A SPEED SIGNAL

(75) Inventors: Ralf Kinder, Eitelborn (DE); Andreas Müller, Koblenz (DE)

(73) Assignee: Lucas Automotive GmbH, Koblenz (DE)

( * ) Notice: Subject to any disclaimer, the term of this patent is extended or adjusted under 35 U.S.C. 154(b) by 450 days.

(21) Appl. No.: 12/920,534

(22) PCT Filed: Dec. 11, 2008

(86) PCT No.: PCT/EP2008/010542
§ 371 (c)(1),
(2), (4) Date: Sep. 24, 2010

(87) PCT Pub. No.: WO2009/109211
PCT Pub. Date: Sep. 11, 2009

(65) Prior Publication Data
US 2011/0004386 A1 Jan. 6, 2011

(30) Foreign Application Priority Data
Mar. 4, 2008 (DE) .......................... 10 2008 012 387

(51) Int. Cl.
*B60T 7/02* (2006.01)
*B60T 13/74* (2006.01)
(Continued)

(52) U.S. Cl.
CPC ................. *B60T 8/885* (2013.01); *B60T 7/042* (2013.01); *B60T 7/107* (2013.01); *B60T 7/12* (2013.01); *B60T 17/18* (2013.01); *B60W 10/182* (2013.01); *B60T 2270/416* (2013.01)

(58) Field of Classification Search
CPC ............... B60T 8/92; B60T 7/12; B60T 7/02; B60T 13/74; B60T 8/88; B60T 8/17; B60T 8/885; B60T 7/042; B60T 7/107; B60T 17/18; B60T 2270/416; B60W 10/182
USPC ...................... 701/70; 188/106 P, 156; 74/523
See application file for complete search history.

(56) References Cited

U.S. PATENT DOCUMENTS 4,561,527 A * 12/1985 Nakamoto et al. ......... 192/219.4
5,111,901 A * 5/1992 Bachhuber et al. ........... 180/415
(Continued)

FOREIGN PATENT DOCUMENTS

DE 3909907 A1 * 9/1990
DE 19839996 A1 3/1999
(Continued)

OTHER PUBLICATIONS

Handbuch "Vehicle Regulations Fahrzeug Vorschriften", Wabco Vehicle Control System, 22th Issue, Year 2004.
(Continued)

*Primary Examiner* — Tuan C. To
(74) *Attorney, Agent, or Firm* — MacMillan, Sobanski & Todd, LLC

(57) ABSTRACT

A technique for controlling an electrically actuable parking brake of a motor vehicle in the event of failure of a first signal indicating a speed of the motor vehicle comprises the steps of continuously closing the parking brake as long as a second signal indicating a driver request to close the parking brake is detected, and opening the parking brake, provided that the parking brake is in a partially open state, as long as an absence of the second signal is detected.

16 Claims, 4 Drawing Sheets

(51) Int. Cl.

| | | |
|---|---|---|
| *B60T 8/88* | (2006.01) | |
| *B60T 8/17* | (2006.01) | |
| *B60W 10/18* | (2012.01) | |
| *B60T 7/04* | (2006.01) | |
| *B60T 7/10* | (2006.01) | |
| *B60T 7/12* | (2006.01) | |
| *B60T 17/18* | (2006.01) | |

(56) References Cited

U.S. PATENT DOCUMENTS

| | | | |
|---|---|---|---|
| 6,019,436 A * | 2/2000 | Siepker | 303/13 |
| 6,049,736 A | 4/2000 | Stewart et al. | |
| 6,053,171 A | 4/2000 | Stewart et al. | |
| 6,101,973 A | 8/2000 | Stewart et al. | |
| 6,382,741 B1 * | 5/2002 | McCann et al. | 303/191 |
| 6,406,102 B1 | 6/2002 | Arnold | |
| 6,626,271 B1 * | 9/2003 | Bohm et al. | 188/158 |
| 6,702,405 B1 | 3/2004 | Balz et al. | |
| 6,802,401 B1 | 10/2004 | Böhm et al. | |
| 6,854,570 B2 * | 2/2005 | Connell | 188/33 |
| 6,997,521 B2 * | 2/2006 | Jensen et al. | 303/15 |
| 7,341,319 B2 | 3/2008 | Klusemann et al. | |
| 7,358,864 B2 * | 4/2008 | Mori et al. | 340/932.2 |
| 7,373,855 B2 * | 5/2008 | Claussen et al. | 74/523 |
| 7,377,364 B2 | 5/2008 | Tyni et al. | |
| 7,677,371 B2 * | 3/2010 | Dong et al. | 188/350 |
| 7,699,751 B2 * | 4/2010 | Barber et al. | 477/197 |
| 8,086,384 B2 * | 12/2011 | Nakayama | 701/79 |
| 8,366,211 B2 * | 2/2013 | Suzuki | 303/191 |
| 8,412,408 B2 * | 4/2013 | Febrer et al. | 701/34.4 |
| 2003/0045977 A1 * | 3/2003 | Sato et al. | 701/35 |
| 2004/0016612 A1 * | 1/2004 | Iwagawa et al. | 188/265 |
| 2004/0055832 A1 | 3/2004 | Mercer | |
| 2004/0070271 A1 * | 4/2004 | Lee | 303/191 |
| 2004/0140710 A1 * | 7/2004 | Alvarez et al. | 303/20 |
| 2005/0029859 A1 | 2/2005 | Bensch et al. | |
| 2005/0270177 A1 * | 12/2005 | Mori et al. | 340/932.2 |
| 2006/0049691 A1 * | 3/2006 | Deprez et al. | 303/191 |
| 2006/0152076 A1 * | 7/2006 | Inagaki et al. | 303/119.1 |
| 2007/0068746 A1 * | 3/2007 | Chittka | 188/72.6 |
| 2007/0199775 A1 * | 8/2007 | Yasukawa | 188/73.1 |
| 2007/0298930 A1 * | 12/2007 | Hofler et al. | 477/92 |
| 2008/0061624 A1 * | 3/2008 | Knechtges et al. | 303/11 |
| 2008/0087509 A1 * | 4/2008 | Kalbeck et al. | 188/156 |
| 2009/0132143 A1 * | 5/2009 | Kamiya et al. | 701/96 |
| 2009/0200124 A1 | 8/2009 | Heise | |

FOREIGN PATENT DOCUMENTS

| | | |
|---|---|---|
| DE | 19838886 A1 | 10/1999 |
| DE | 19908062 A1 | 8/2000 |
| DE | 19962556 A1 | 7/2001 |
| DE | 10343131 A1 | 4/2004 |
| DE | 10336611 A1 | 3/2005 |
| DE | 10345485 A1 | 4/2005 |
| DE | 10351589 A1 | 6/2005 |
| DE | 102007029632 A1 | 1/2008 |
| EP | 1053149 A1 | 11/2000 |
| EP | 1595763 A1 * | 11/2005 |
| EP | 1610991 A1 | 1/2006 |
| EP | 1997700 A2 | 12/2008 |
| WO | 0073114 A1 | 12/2000 |
| WO | 2004000618 A1 | 12/2003 |
| WO | 2004089711 A1 | 10/2004 |
| WO | 2006000618 A2 | 1/2006 |
| WO | 2006053888 A1 | 5/2006 |
| WO | 2008000769 A1 | 1/2008 |

OTHER PUBLICATIONS

ECE-R13 (Economic Commission for Europe Regulation 13); Oct. 16, 1995.
Fahrwerkhandbuch ATZ; Heising, Ersoy, Gleβ; 3rd Issue; Vieweg Teubner; Imparticular pp. 173; 185-188.
Fahrwerkhandbuch, ATZ; Heiβing, Ersoy, Gies; 3rd Edition, Vieweg Teubner; 2011; Imparticular pp. 173; 185-188.

* cited by examiner

CONTROLLING AN ELECTRICALLY ACTUABLE PARKING BRAKE IN THE EVENT OF FAILURE OF A SPEED SIGNAL

CROSS-REFERENCE TO RELATED APPLICATIONS

This application is a national stage of International Application No. PCT/EP2008/010542 filed Dec. 11, 2008, the disclosures of which are incorporated herein by reference in entirety, and which claimed priority to German Patent Application No. 10 2008 012 387.0 filed Mar. 4, 2008, the disclosures of which are incorporated herein by reference in entirety.

BACKGROUND OF THE INVENTION

The invention relates generally to motor vehicle brake systems. In particular the invention relates to control of a parking brake in the event of failure of a speed signal.

Modern motor vehicles have a plurality of mutually independent brake systems. A first brake system is conventionally designed as a service brake and may comprise additional systems that improve driving stability of the motor vehicle during a braking operation, for example ABS, ESP or anti-spin control. A second brake system is normally designed primarily for parking-brake operations, i.e. keeping the motor vehicle in a stationary state. For safety reasons, it is a requirement that a parking brake also has to be usable for bringing a moving motor vehicle to a standstill, for example if the service brake has failed or is functional only to a limited extent. Electrically actuable parking brake systems may moreover assist a driver when stopping or starting the motor vehicle on an ascending or descending gradient.

In order to drive an electrically actuable parking brake in different ways depending on whether the moving motor vehicle is to be braked in a "dynamic mode" of the parking brake or the stationary motor vehicle is to be kept in a stationary state in a "static mode" of the parking brake, a signal indicating a speed of the motor vehicle is processed. On the basis of this signal a driver-controlled signal to open and/or close the parking brake may then be converted in a manner appropriate to the situation into a corresponding driving of actuators of the parking brake. For safety reasons, it is a requirement that a parking brake even in the event of failure of such a speed signal still has to be usable to brake the motor vehicle and keep it in a stationary state.

For this purpose, in the European patent EP 1 610 991 B1, and corresponding U.S. Pat. No. 7,341,319 B2, both of which are incorporated by reference herein in entirety, it is proposed that an electric parking brake in the event of failure of the speed signal and activation by a driver is brought in a first step into a partially closed state. After a predetermined time has elapsed, the parking brake in a second step is then transferred suddenly from the partially closed state to a fully closed state. The proposed procedure is based on the assumption that the motor vehicle, if it was in motion during the first step, has come to a standstill before the second step.

In some situations, however, this assumption is incorrect, for example when braking from high speed or during prolonged downhill travel, and the directional stability of the vehicle may be jeopardized by the sudden full closing of the parking brake. If the parking brake of the still moving motor vehicle is namely suddenly fully closed, it is then possible for one or more of the wheels of the motor vehicle to lock, leading to an impairment of the driving stability of the motor vehicle.

BRIEF SUMMARY OF THE INVENTION

The underlying feature of the invention is to eliminate the previously indicated drawbacks in the event of failure of a speed signal during a parking-brake operation.

According to a first aspect, a method for controlling an electrically actuable parking brake of a motor vehicle in the event of failure of a first signal indicating a speed of the motor vehicle is provided, which comprises the steps of continuously closing of the parking brake as long as a second signal indicating a driver request to close the parking brake is detected, and opening the parking brake if an absence of the second signal is detected, provided that the parking brake is in a partially opened state.

The first signal may be for example a wheel speed signal or a signal formed from a plurality of wheel speed signals; alternatively or in addition thereto, the first signal may be formed for example also on the basis of a signal of a gyrator or navigation system. The second signal may be for example an electrical signal that the driver of the motor vehicle generates by means of an electric pushbutton or switch.

The method may comprise fully opening the parking brake if the second signal is not detected (once more) during opening. In this way the driver, by not generating the second signal, may fully release the parking brake, or he may in the course of release generate the second signal afresh and therefore close the parking brake. A second signal generated and not generated in rapid succession by the driver may keep the parking brake in an associated range of an opening state.

The continuous closing comprises no sudden changes that impair the driving stability and may comprise a continuous closing at a limited closing speed. In a variant, the limited closing speed lies below a maximum closing speed achievable by the control unit. The continuous closing may also comprise not maintaining a partially open state of the parking brake for a specific period, i.e. not inserting a pause during the closing operation.

The closing speed may be constant. In this case, a linear closing of the parking brake may occur. The closing speed characteristic may however for example also vary linearly, for example rise linearly or fall linearly. In this case, a closing of the parking brake may occur progressively or inversely progressively. A closing speed may be expressed for example in the form of a characteristic of a closing travel, a closing force or a closing pressure over time.

The method may further comprise a keeping of the parking brake in a fully closed state, provided the parking brake in the absence of the second signal is in the fully closed state. In this way, the parking brake may be brought into a closed, locked state, in which for example it prevents a stationary motor vehicle from unintentionally rolling away.

The method may further comprise opening the parking brake situated in a fully closed state if the presence of a third signal indicating a driver request to open the parking brake is given. This third signal may be identical to the second signal or be derived therefrom.

The parking brake may comprise a plurality of groups of actuators, and the closing of the parking brake may comprise increasing the brake force of the actuators of at least a first group and maintaining the brake force of the actuators of at least a second group. Thus, if a maximum of a μ-slip curve is exceeded by one or more wheels, the wheel or wheels, of which the actuators were not further closed, still transmit lateral guiding forces. Each of the groups may comprise one or more actuators. In an embodiment, the first group comprises a plurality of actuators that are associated with a front axle of the motor vehicle, and the second group comprises a plurality of actuators that are associated with a rear axle of the motor vehicle. In a further embodiment, each group comprises in each case actuators that are associated with diagonally opposite wheels of the motor vehicle.

The method may further comprise determining a state of motion of the motor vehicle on the basis of the first signal. The state of motion may comprise a speed and/or a direction of motion of the motor vehicle. The direction of motion may designate a forward/reverse motion of the motor vehicle and/ or an absolute direction of motion of the motor vehicle. In particular, the state of motion may indicate a stationary state of the motor vehicle.

If the motor vehicle is stationary, the method may further comprise full closing of the parking brake if at least temporarily the second signal is detected. Thus, the driver may for example by briefly actuating a pushbutton or switch that generates the second signal ensure that the parking brake is closed and the motor vehicle is kept in the stationary state.

If the motor vehicle is in motion, the method may further comprise bringing the parking brake into a partially closed state if the second signal is detected, and opening the parking brake in the absence of the second signal. The partially closed state may be defined for example by a closing travel, a closing time, a closing force or a closing pressure. If a movement of the motor vehicle has been reliably detected, this allows a predetermined brake force to be exerted for example by means of the parking brake on the motor vehicle so long as the driver keeps a pushbutton pressed. If he lets go of the pushbutton while the motor vehicle is still moving, then the parking brake is released.

According to a second aspect, a computer program product having program code means is provided for executing the previously described method when the computer program product is running at a processing module. Such a processing module may be a control unit on or in the motor vehicle. The processing module may also control further functions of the motor vehicle, for example braking functions such as ABS, ESP or hill hold assistance.

The computer program product may be stored on a computer-readable data carrier. For example, the computer program product may be stored on a mobile data carrier, such as for example a diskette, a hard disk, a CD, a WORM or a DVD, or on a fixed data carrier, such as for example a semiconductor memory (for instance a RAM, ROM, EPROM, EEPROM, NOVRAM or Flash).

According to a third aspect, a control device for an electrically actuable parking brake of a motor vehicle in the event of failure of a first signal indicating a speed of the motor vehicle is provided, which comprises a first determination device for determining a failure of a first signal indicating a speed of the motor vehicle, a detection device for detecting a second signal indicating a driver request to close the parking brake, a second determination device for determining a partially open state of the parking brake, a closing device for continuously closing the parking brake as long as the second signal is present, and an opening device for opening the parking brake in the absence of the second signal, provided the parking brake is in a partially open state.

The first determination device may determine a loss of the first signal on the basis of a processing of one or more sensor signals. Alternatively or in addition thereto, a loss may be determined given a lack of plausibility of sensor signals or combinations thereof. The detection device may comprise for example a switch or a pushbutton. The second determination device may comprise for example a sensor arranged in connection with an actuator. Such a sensor may for example a travel, time, force or pressure that indicates an opening state of the actuator. The closing device may comprise a drive circuit for the electrically actuable parking brake. In particular, it may comprise a drive circuit for one or more actuators. The opening device may be of an analogous construction to the closing device or be integrated therewith.

The control device may comprise a third determination device for determining a state of motion of the motor vehicle. The third determination device may for example be connected to the same signal sources as the first determination device.

The parking brake may comprise a plurality of groups of actuators and the opening- and closing devices of the control device may be configured to actuate the actuators of at least two groups independently of one another. Each of the groups may comprise one or more actuators and each actuator may comprise a locking device for maintaining a state.

Other advantages of this invention will become apparent to those skilled in the art from the following detailed description of the preferred embodiments, when read in light of the accompanying drawings.

BRIEF DESCRIPTION OF THE DRAWINGS

In the figures, corresponding elements bear identical reference characters.

DETAILED DESCRIPTION OF THE INVENTION

Figure 1:
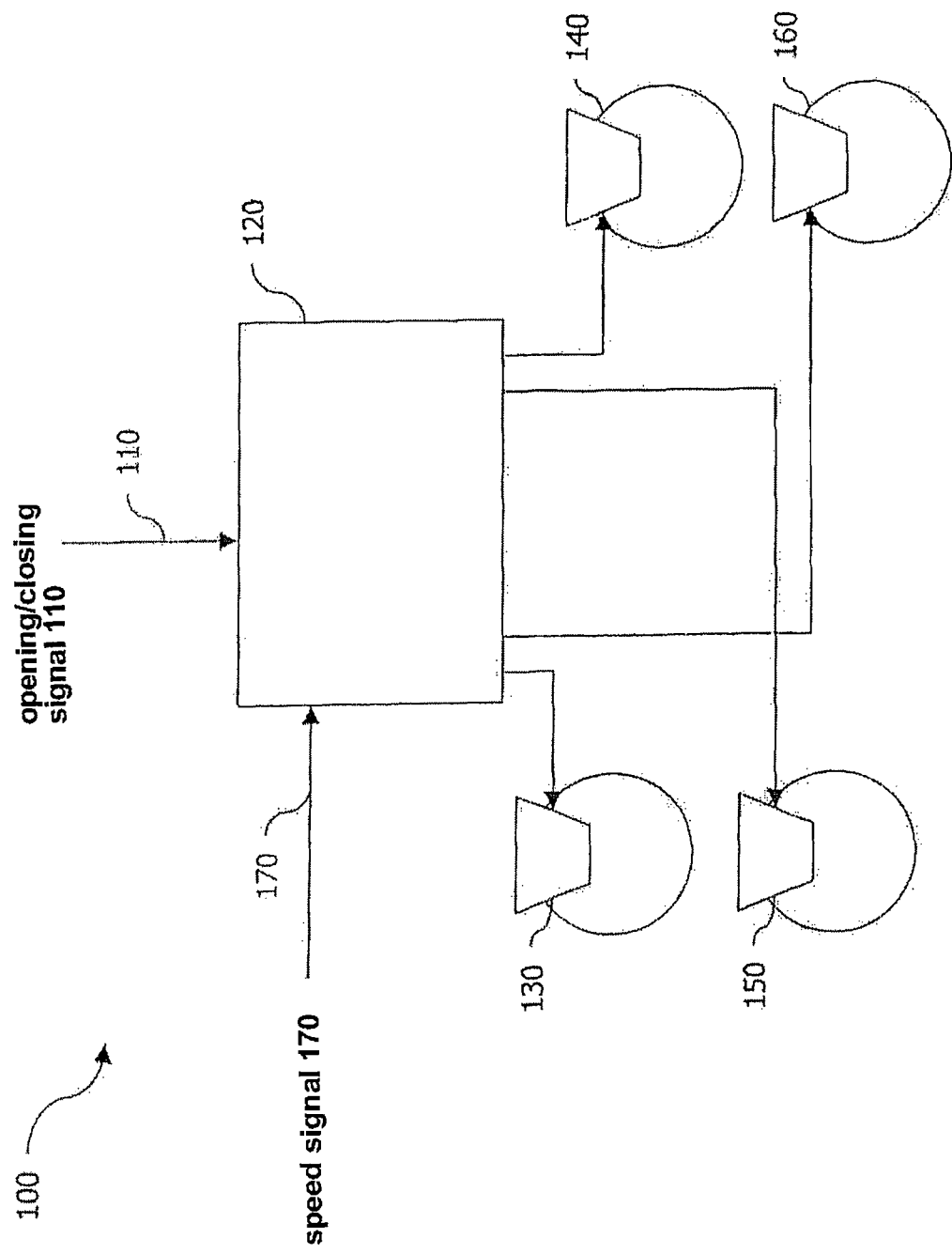
FIG. 1 shows a schematic overview of an electrically actuable parking brake of a motor vehicle.

FIG. 1 shows an embodiment of an electrically actuable parking brake 100 of a motor vehicle. The parking brake 100 comprises a processing module 120, which has an input for an opening/closing signal 110 and is connected to actuators 130, 140, 150 and 160. The processing module 120 moreover has an input for a speed signal 170. The opening/closing signal 110 is generated by a driver of the motor vehicle and signals a driver request to open and/or close the parking brake.

In the embodiment represented in FIG. 1, the motor vehicle is a motor lorry having two rear axles. With each of the two rear axles in each case two wheel brakes are associated, and associated in turn with each wheel brake is one of the actuators 130 to 160. In each case two actuators form an actuator group. In this case, the two actuators of an actuator group may be associated with the same rear axle or with different rear axles.

In a departure from the described embodiment, the teaching described here may also be implemented in a motor vehicle that has only one rear axle. In such a case, two of the actuators would then be associated with the front axle and the other two actuators with the rear axle. According to a further variant, only two actuators are provided and are associated with the (for example single) rear axle. This variant corresponds to the conventional layout of a passenger car parking brake system, which acts exclusively upon the rear axle.

The processing module 120 is configured to open, close or maintain in groups a state of the actuators 130 to 160 represented in FIG. 1. It controls the actuators 130 to 160 in dependence upon the opening/closing signal 110 and a speed signal 170. If the speed signal 170 is present, then a moving state and a stationary state of the motor vehicle may be reliably detected. In dependence upon the opening/closing signal 110 the actuators 130 to 160 may then be controlled in accordance with a braking of the motor vehicle in a dynamic mode of the parking brake 100 or in accordance with a maintaining of the stationary state of the motor vehicle in a static mode.

Figure 2:
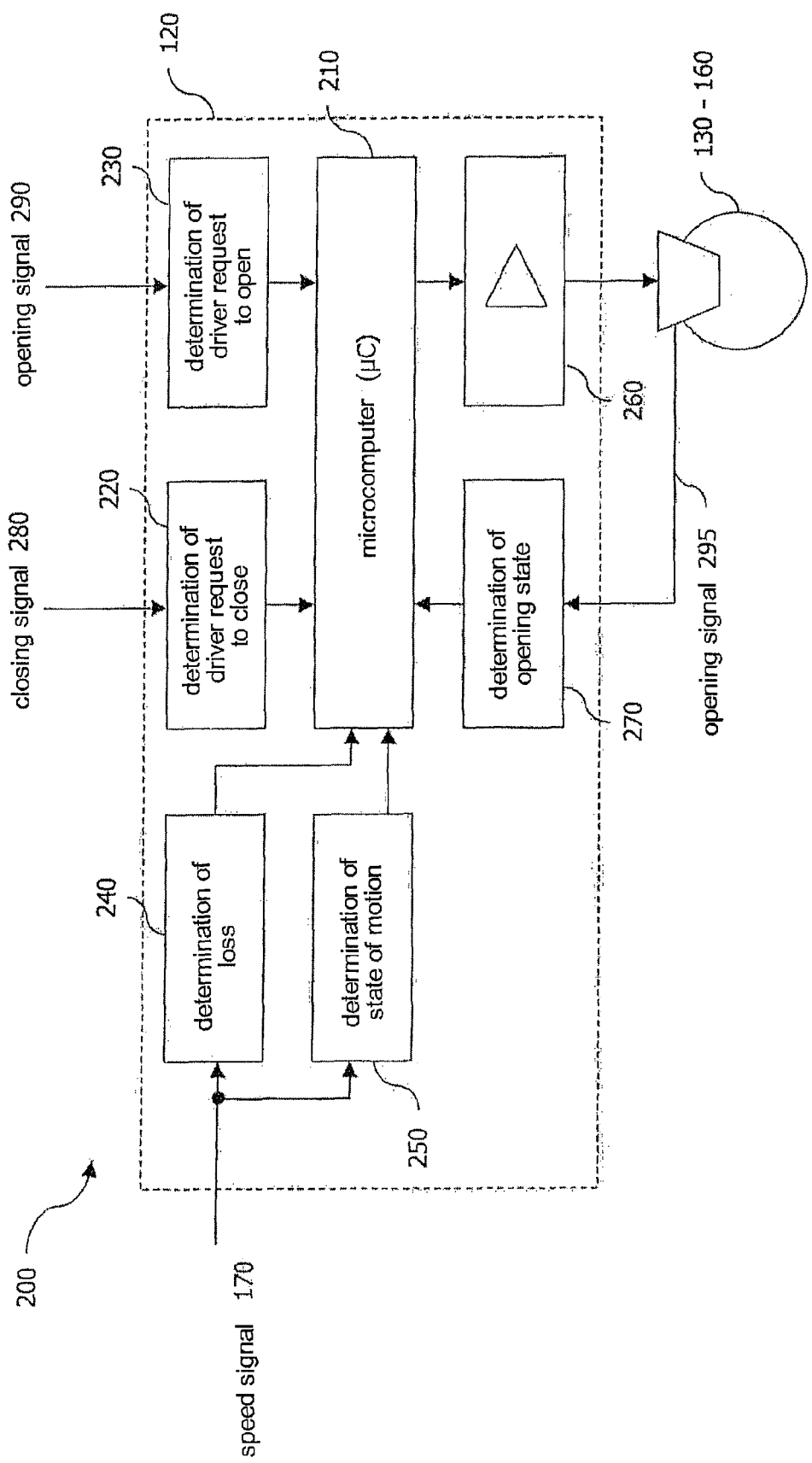
FIG. 2 shows a schematic representation of a control device according to FIG. 1.

FIG. 2 shows in a schematic representation a control device 200 for the electrically actuable parking brake 100 of FIG. 1. The control device 200 contains the processing module 120 shown in FIG. 1. The processing module 120 comprises a microcomputer 210, which is connected to determination units 220, 230, 240, 250 and 270 as well as to a driver device 260.

The determination unit 220 is configured to detect a closing signal 280 and to signal to the microcomputer 210 that a driver request to close the parking brake is present. In a corresponding fashion, the determination unit 230 detects an opening signal 290 and signals to the microcomputer 210 that a driver request to open the parking brake is present. Each of the signals 280 and 290 may be generated by means of a dedicated pushbutton or switch (not shown). Alternatively, the opening signal 280 and the closing signal 290 may be present in a combined form as opening-closing signal 110. In this case, the opening/closing signal 110 may be generated for example by means of a single pushbutton (not shown). Pressing the pushbutton or switch then generates (alternately and/or in a situation-related manner) an opening signal or a closing signal. The determination devices 220 and 230 in this case may take the form of an integrated unit.

In an alternative embodiment, a three-position switch (not shown) may be used to generate the signals 280 and 290 which for example generates in a first position the opening signal (290), in a second position no signal at all, and in a third position the closing signal (290). In this way, the opening signal and the closing signal may be mutually exclusive.

The determination units 240 and 250 are configured to evaluate the speed signal 170. The determination unit 240 signals a failure of the speed signal 170 to the microcomputer 210, while the determination unit 250 on the basis of the speed signal 170 (and any further signals, which are not shown) determines a moving state of the motor vehicle and supplies this to the microcomputer 210.

The microcomputer 210 by means of the driver device 260 controls the actuators 130-160 in such a way that they are opened, closed or maintained in their state. For the sake of clarity, only one driver device 290 and one of the actuators 130-160 are illustrated representatively in FIG. 2, although a plurality of actuators may be driven individually or in groups, as mentioned above with reference to FIG. 1. The driver device 260 may drive each of the actuators 130-160 for example by means of pulse width modulation, current-control or voltage control or in some other known manner.

The determination device 270 evaluates an opening signal 295 of one of the actuators 130 to 160 and signals to the microcomputer 210 an opening state of the actuator. The opening signal may be for example a rotary signal of an electric motor or a time-, travel-, pressure- or force signal. In other embodiments, the determination device 280 may determine the opening state for example also from a time characteristic of a current or a voltage, wherein corresponding values may be sampled for example across the actuator or across the driver device 290.

Figure 3:
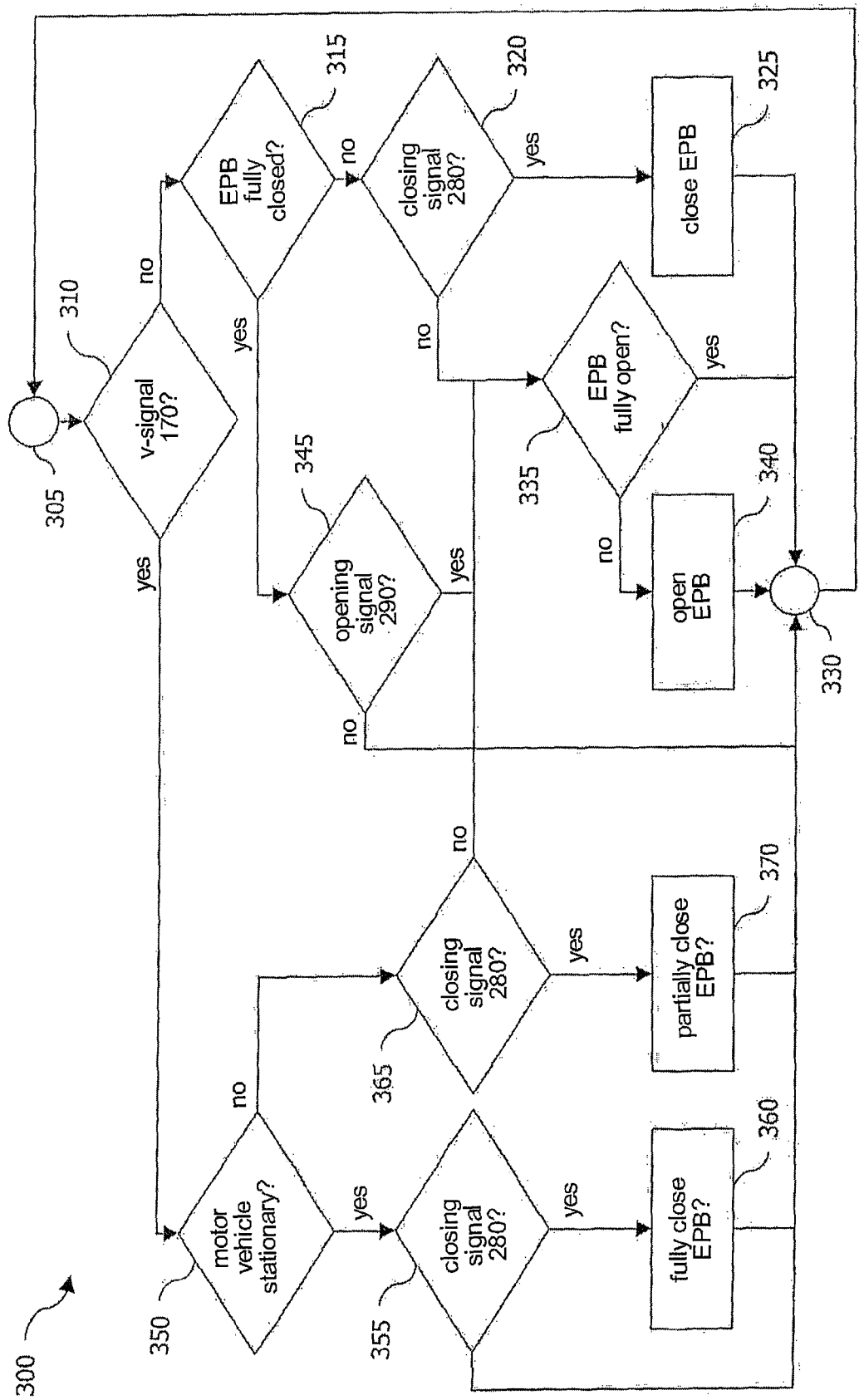
FIG. 3 shows a schematic sequence diagram of a method of controlling a parking brake according to FIG. 1.

FIG. 3 shows a schematic sequence diagram 300 of a method of controlling the electrically actuable parking brake 100 according to FIG. 1. For the sake of clarity, only control of the actuator 130 is representatively described.

Proceeding from an initial state 305, in a first step 310 it is determined whether or not a speed signal (v-signal) 170 is present. An absence of the speed signal 170 may be also determined if a signal indicating a speed of the motor vehicle is identified as implausible or undefined. If in step 310 an absence of the speed signal 170 is determined, then in a step 315 it is checked whether the driven actuator 130 is fully closed. If this is not the case, in a step 320 it is checked whether or not the closing signal 280 is present. As mentioned above, the closing signal 280 may be identical with the opening signal 290 and be present as a combined opening/closing signal 110. If the closing signal 280 is present, then in a following step 325 the actuator 130 is continuously closed (i.e. without sudden changes in the brake force that impair the directional stability) as long as the closing signal 280 is detected. This operation is described more precisely further below with reference to FIGS. 4a and 4b. As the state 330 following the step 325 corresponds to the state 305, the method may be executed anew.

If on the other hand it is established in step 320 that the closing signal 280 is not present, then in a step 335 it is checked whether the actuator 130 is fully open. If this is the case, the method is once again in the state 330 (or 305). Otherwise the actuator 130 is opened in a step 340.

By means of the steps 305 to 340 hitherto described the motor vehicle, even in the absence of a speed signal 170, may be braked by the driver by means of the parking brake 100 without risking an unstable driving state as a result of instantaneous full closing of the parking brake 100. The drive may nevertheless bring about a fully closed, locked state of the parking brake 100 for keeping the motor vehicle in a stationary state.

If in step 315 it is found that the parking brake 100 is already fully closed, then in a step 345 the presence of the opening signal 290 is checked. If no opening signal 290 is present, then the method enters the state 330 (or 305). Otherwise the parking brake 100 is first opened in the steps 335 and 340, as mentioned above, if it is not yet fully open, before the method assumes the state 330 (or 305).

The steps 350 to 370 of the method 300 that are described below relate to the control of the parking brake 100 if the presence of the speed signal 170 is given.

If in step 310 it is found that the speed signal 170 is present, then in a step 350 it is queried whether the motor vehicle is in a stationary state. If the motor vehicle is stationary, the parking brake 100 is operated in a static mode, in which it is first determined in a step 355 whether a closing signal 280 is present. If the closing signal 280 is present, then in a step 360 the parking brake 100 is fully closed and the static mode is terminated before the method is back in the state 330 (or 305). If in step 355 it is found that no closing signal 280 is present, then the method enters the state 330 (or 305). It should be noted that in step 360 a closing of the parking brake 100 occurs not only as long as the closing signal 280 is present but that also in the case of an only temporary presence of the closing signal 280 the parking brake 100 in step 360 is fully closed.

If in step 350 it is determined that the motor vehicle is not stationary, the parking brake 100 is operated in a dynamic mode. In this mode it is first determined in a step 365 analogous to the step 355 whether the closing signal 280 is present. If it is present, then in a step 370 the parking brake 100 is partially closed (for example so long as the closing signal 280 is detected). After the step 370 the dynamic mode is terminated and the method enters the state 330 (or 305). If in step 365 it is determined that the closing signal 280 is not (or no longer) present, an opening of the parking brake 100 occurs in the steps 335 and 340, as described above.

Figure 4A:
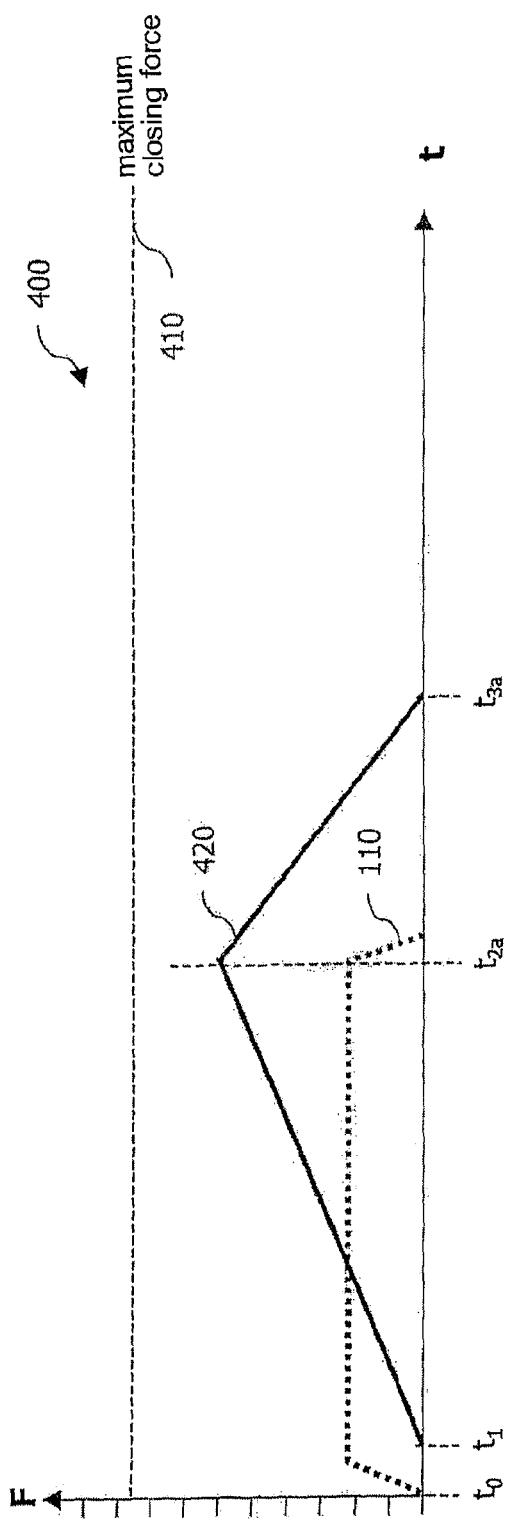
FIGS. 4 *a* and *b* show different characteristics of opening states of a parking brake and driver-controlled signals.
Figure 4B:
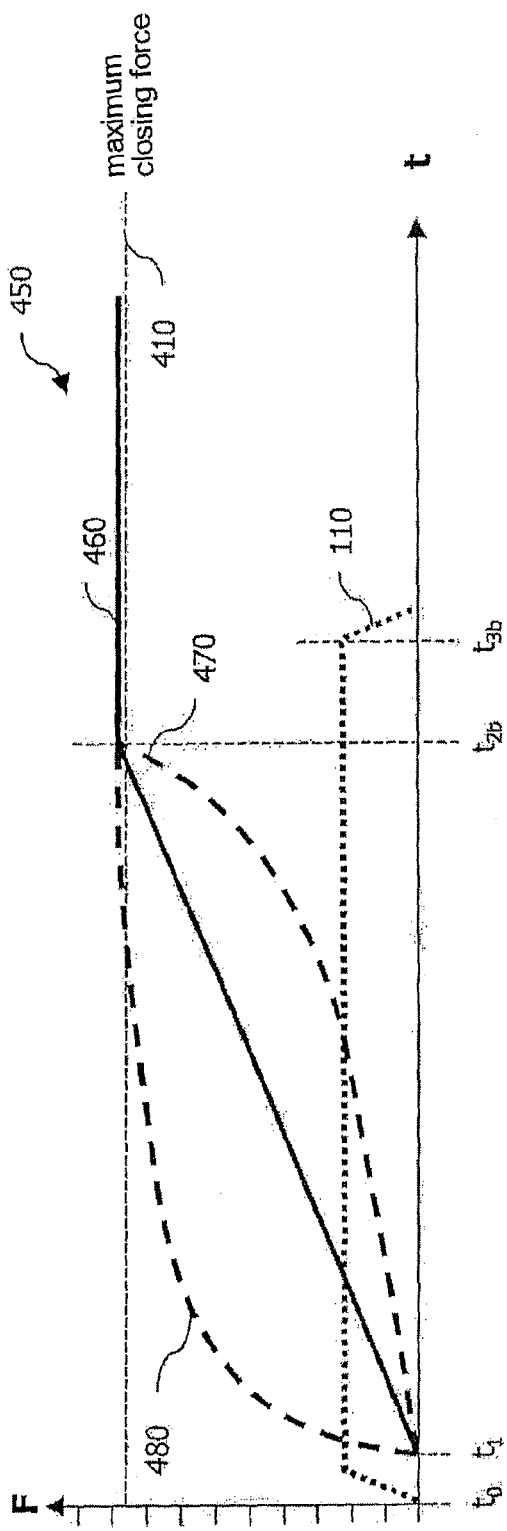

FIGS. 4a and 4b show different time characteristics 400 and 450 of the closing forces of the parking brake 100 according to FIG. 1 and of an opening/closing signal 110 in the absence of a speed signal 170. In both figures the horizontal axes denote the time, while the vertical axes denote a closing force F of the parking brake 100 as an example of a quantity indicating an opening state of the parking brake 100. As mentioned above, as a measure of an opening state of the parking brake 100 a closing travel or a hydraulic actuating pressure for example might be used instead of the closing force. A maximum closing force 410, which corresponds to a fully closed state of the parking brake 100, is plotted in the form of a horizontal dashed line in both FIGS. 4a and 4b. For the (for example binary) opening/closing signal 110, merely its presence is indicated in vertical direction.

In FIG. 4a, the opening/closing signal 110 is present from the time $t_0$. After a short delay, from the time $t_1$ in response to the opening/closing signal 110 the parking brake 100 is continuously closed and the closing force 420 rises. Even before the closing force 420 reaches the maximum closing force 410, at a time $t_{2a}$ the opening/closing signal 110 falls away and the parking brake 100 is subsequently opened again, as is evident from the falling closing force 420. At the time $t_{3a}$ the parking brake 100 is fully open and the closing force 420 has returned to the value zero.

FIG. 4b shows another characteristic of a closing force 460 of the parking brake 100. As in FIG. 4a, the opening/closing signal 110 is present from the time $t_0$, and from the time $t_1$ a continuous closing of the parking brake 100 ensues, with the result that the closing force 460 is continuously increased. When at a time $t_{2b}$ the closing force 460 reaches the maximum closing force 410, the opening/closing signal 110 is still present.

At the time $t_{2b}$ the parking brake 100 is therefore fully closed and is subsequently kept in the fully closed state even when the opening/closing signal 110 later falls away. The closing force 460 in this case remains constant at just above the maximum closing force 410. The reason for the slight "overshooting" of the maximum closing force 410 by the closing force 460 may be for example an after-run of an electric motor that drives the actuator. From the time $t_{3b}$ the opening/closing signal 110 falls away.

In contrast to the situation in FIG. 4a, the closing force 460 remains at its maximum value even after the time $t_{3b}$ because the parking brake, once it has reached a fully closed state, is not opened independently of the absent opening/closing signal 110.

The alternative characteristics 470 and 480 of the closing force plotted between the times $t_1$ and $t_{2b}$ in FIG. 4b represent other variants of a continuous closing of the parking brake 100. The characteristic 470 corresponds to a progressive closing of the parking brake, which corresponds to a linearly rising closing speed. The characteristic 480 represents an inversely progressive characteristic of the closing force, which corresponds to a linearly falling closing speed. The closing speed between the times $t_1$ and $t_{2b}$ that is associated with the characteristic 460 is, on the other hand, constant. From the time $t_{2b}$ the characteristics 460, 470 and 480 are identical to one another and only the characteristic 460 is plotted. Corresponding progressive and inversely progressive characteristics 470 and 480 are possible also in the situation represented in FIG. 4a, but are not plotted.

FIG. 4a graphically illustrates how a brake force in response to the opening/closing signal 110 is built up continuously and without sudden changes in brake force and then reduced. The parking brake 100 therefore behaves in a manner that is predictable and controllable by the driver, and an unstable driving state may be avoided.

In FIG. 4b it may clearly be seen how the parking brake 100 is brought into a fully closed state without the insertion of a "pause", as it is proposed in EP 1 610 991 B1. The driver therefore does not have to wait for a locking of the parking brake in the fully closed state, this reducing the risk of a parking brake being inadvertently not locked.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method of controlling an electrically actuable parking brake of a motor vehicle comprising the steps of:
   determining an absence of a first signal indicating a speed of the motor vehicle;
   closing continuously the parking brake as long as a second signal indicating a driver request to close the parking brake is detected; and
   opening the parking brake if an absence of the second signal is detected, provided that the parking brake is in a partially open state;
   wherein the parking brake upon detecting the second signal is continuously closed until a closing force reaches a maximum closing force;
   wherein the parking brake is maintained in the fully closed state, provided that the parking brake in the absence of the second signal is in the fully closed state; and
   wherein the absence of the first signal is determined if no first signal is available or the first signal is implausible or undefined.

2. The method according to claim 1, further comprising fully opening the parking brake if the second signal is not detected during the opening.

3. The method according to claim 1, wherein the continuous closing comprises a continuous closing at a limited closing speed.

4. The method according to claim 3, wherein the closing speed is substantially constant.

5. The method according to claim 3, wherein the closing speed varies substantially linearly.

6. The method according to claim 1, further comprising opening the parking brake situated in a fully closed state if the presence of a third signal indicating a driver request to open the parking brake is given.

7. The method according to claim 1, wherein the parking brake comprises a plurality of groups of actuators, wherein the closing of the parking brake comprises increasing the brake force of the actuators of at least a first group and maintaining the brake force of the actuators of at least a second group.

8. The method according to claim 1, further comprising determining a state of motion of the motor vehicle on the basis of the first signal.

9. The method according to claim 8, wherein the motor vehicle is in a stationary state, and further comprising fully closing the parking brake if at least temporarily the second signal is detected.

10. A computer program product having program code means for executing a method according to claim 1 when the computer program product is running at a processing module.

11. The computer program product according to claim 10, when it is stored on a computer-readable data carrier.

12. A device for controlling an electrically actuable parking brake of a motor vehicle in the event of an absence of a first signal indicating a speed of the motor vehicle, comprising:
  a first determination device for determining an absence of a first signal indicating a speed of the motor vehicle;
  a detection device for detecting a second signal indicating a driver request to close the parking brake;
  a second determination device for determining a partially open state of the parking brake;
  a closing device for continuously closing the parking brake as long as the second signal is detected; and
  an opening device for opening the parking brake if the second signal is absent, provided that the parking brake is in a partially open state;
  wherein the closing device is adapted upon detection of the second signal to continuously close the parking brake until a closing force reaches a maximum closing force; and to maintain the parking brake in the fully closed state, provided that the parking brake in the absence of the second signal is in the fully closed state; and
  wherein the absence of the first signal is determined if no first signal is available or the first signal is implausible or undefined.

13. The device according to claim 12, further comprising a third determination device for determining a state of motion of the motor vehicle.

14. The device according to claim 12, wherein the parking brake comprises a plurality of groups of actuators and the opening and closing devices are configured to actuate the actuators of at least two groups independently of one another.

15. A method of controlling an electrically actuable parking brake of a motor vehicle comprising the steps of:
  closing continuously the parking brake as long as a signal indicating a driver request to close the parking brake is detected; and
  opening the parking brake if an absence of the signal is detected, provided that the parking brake is in a partially open state; wherein
  the parking brake upon detecting the signal is continuously closed until a closing force reaches a maximum closing force; wherein
  the parking brake is maintained in the fully closed state, provided that the parking brake in the absence of the signal is in the fully closed state; and wherein
  the continuous closing comprises a continuous closing at a limited closing speed.

16. A method of controlling an electrically actuable parking brake of a motor vehicle comprising the steps of:
  closing continuously the parking brake as long as a signal indicating a driver request to close the parking brake is detected; and
  opening the parking brake if an absence of the signal is detected, provided that the parking brake is in a partially open state; wherein
  the parking brake upon detecting the signal is continuously closed until a closing force reaches a maximum closing force; wherein
  the parking brake is maintained in the fully closed state, provided that the parking brake in the absence of the signal is in the fully closed state; and wherein
  the parking brake comprises a plurality of groups of actuators, wherein the closing of the parking brake comprises increasing the brake force of the actuators of at least a first group and maintaining the brake force of the actuators of at least a second group.

* * * * *